US008462486B2

(12) United States Patent
Fink et al.

(10) Patent No.: US 8,462,486 B2
(45) Date of Patent: Jun. 11, 2013

(54) GAS-INSULATED MEDIUM-VOLTAGE SWITCHGEAR ASSEMBLY

(75) Inventors: Harald Fink, Ratingen (DE); Maik Hyrenbach, Duisburg (DE)

(73) Assignee: ABB Technology AG, Zurich (CH)

( * ) Notice: Subject to any disclaimer, the term of this patent is extended or adjusted under 35 U.S.C. 154(b) by 740 days.

(21) Appl. No.: 11/630,908

(22) PCT Filed: Jun. 27, 2005

(86) PCT No.: PCT/EP2005/006892
§ 371 (c)(1),
(2), (4) Date: Aug. 4, 2009

(87) PCT Pub. No.: WO2006/000443
PCT Pub. Date: Jan. 5, 2006

(65) Prior Publication Data
US 2009/0296320 A1   Dec. 3, 2009

(30) Foreign Application Priority Data

Jun. 28, 2004  (DE) .......................... 10 2004 031 090
Jun. 23, 2005  (DE) .......................... 10 2005 029 600

(51) Int. Cl.
*H02B 13/035*   (2006.01)
(52) U.S. Cl.
USPC ............................ 361/612; 361/619; 361/621
(58) Field of Classification Search
USPC .................. 361/601–605, 619, 621
See application file for complete search history.

(56) References Cited

U.S. PATENT DOCUMENTS

| 1,992,024 | A | * | 2/1935 | Davies ........................... 361/613 |
| 3,697,819 | A | * | 10/1972 | Eichelberger et al. ........ 361/603 |
| 4,687,890 | A | | 8/1987 | Yamamoto et al. |
| 5,715,134 | A | * | 2/1998 | Maineult et al. .............. 361/604 |
| 5,796,060 | A | * | 8/1998 | Fuchsle et al. .................. 218/79 |
| 6,696,925 | B1 | * | 2/2004 | Aiello, Jr. ................ 340/870.02 |
| 7,417,840 | B2 | * | 8/2008 | Viaro et al. .................. 361/93.1 |

FOREIGN PATENT DOCUMENTS

| CA | 2567781 C | 12/2005 |
| DE | 2133087 A1 | 3/1972 |
| DE | 3143279 C2 | 5/1983 |
| DE | 32 15 236 A1 | 11/1983 |
| DE | 3412325 C2 | 10/1985 |
| DE | 4312621 | 10/1994 |
| DE | 4412784 | 4/1997 |

(Continued)

OTHER PUBLICATIONS

The International Bureau of WIPO, Patent Cooperation Treaty PCT International Preliminary Report on Patentability for PCT/EP2005/006892, Date of issuance Dec. 28, 2006, by Yolaine Cussac Authorized Officer.

(Continued)

*Primary Examiner* — Gregory Thompson
(74) *Attorney, Agent, or Firm* — Michael M. Rickin

(57) ABSTRACT

The invention relates to a gas-insulated medium-voltage switchgear comprising circuit breakers, disconnectors, and earth electrodes according to the preamble of patent claim 1. The aim of the invention is to fulfill the described market-specific requirements and to improve one such gas-insulated medium-voltage switchgear. To this end, the circuit breaker region is measured in such a way that the circuit breakers, and the output-side disconnectors and earth electrodes are all arranged therein.

10 Claims, 2 Drawing Sheets

FOREIGN PATENT DOCUMENTS

| | | |
|---|---|---|
| DE | 10217921 A1 | 10/2002 |
| DE | 10314459 A1 | 10/2004 |
| EP | 0174251 | 3/1986 |
| EP | 0 593 902 A1 | 4/1994 |
| EP | 1054493 | 11/2000 |
| JP | 2004/064955 A | 2/2004 |
| JP | 2002/317557 | 5/2004 |
| WO | 02/15351 A1 | 2/2002 |
| WO | 02/15352 | 2/2002 |

OTHER PUBLICATIONS

Federal Court File No. T-735-11—Canada, ABB Technology AG and ABB Inc. as Plaintiffs and Hyundai Heavy Industries Co., Ltd. as Defendant. "Statement of Defence and Counterclaim", 24 pages, served Jun. 28, 2011.

Federal Court File No. T-735-11—Canada, ABB Technology AG and ABB Inc. as Plaintiffs and Hyundai Heavy Industries Co., Ltd. as Defendant. "Statement of Claim"—27 pages—Apr. 28, 2011.

Hyundai Heavy Industries Co. Ltd., Federal Court File No. T-735-11—Canada, ABB Technology AG and ABB Inc. as Plaintiffs and Hyundai Heavy Industries Co., Ltd. as Defendant. "Amended Statement of Defence and Counterclaim", 24 pages without Schedules, amended Dec. 16, 2011.

Johann Moedi, Examination Office for, German Patent Office—First Examination Report, Serial No. 10 2005 029 600.9, Applicant ABB Technology AG, Case No. 05/584 SM/SP, pp. 1-10 with English Translation of pp. 7-9.

Ken Bode, Switchgear for 2000 and beyond, Dec. 2000, pp. 286-292, Power Engineering Journal.

Stan Stewart, Distribution Switchgear, 2004, IET Power and Energy Series 46, The Institution of Engineering and Technology, London, United Kingdom.

Philip Bolin, Gas-Insulated Substations, 2003, pp. 2-1 to 2-18, Chapter 2 of a compilation entitled "Electric Power Substations Engineering" Edited by John D. McDonald, CRC Press, Boca Raton, FL.

IEC International Standard 62271-200, High-voltage switchgear and controlgear—Part 200: AC metal-enclosed switchgear anfd controlgear for rated voltages above 1 kV and up to and including 52 kV, pp. 1-169, First edition, Nov. 2003, Geneva, Switzerland.

J.C. Tobias et al. The impact of standardisation in MV circuit breaker panels, pp. 278-285, Power Engineering Journal, Dec. 2000.

Canadian Intellectual Property Office, File Wrapper for CA 2570772.

Johann Moedi, German Patent Office—First Examination Report, Serial No. 10 2005 029 600.9, Applicant ABB Technology AG, Case No. 05/584 SM/SP, pp. 1-10 with English Translation of pp. 7-9, 2011.

\* cited by examiner

GAS-INSULATED MEDIUM-VOLTAGE SWITCHGEAR ASSEMBLY

The invention relates to a gas-insulated medium-voltage switchgear assembly having circuit breakers, isolators and ground conductors.

In addition to a circuit breaker, which is usually permanently installed, an isolator is also provided in electrical switchgear assemblies, in particular in medium-voltage switchgear assemblies, which isolator is arranged between the circuit breaker and the busbar current path and shall assume three positions: connected position, disconnected position and grounding position. This isolator is therefore in the form of a three-position isolator.

In the connected position, a connection to the voltage-carrying busbar is produced, and, in the grounding position, a connection to ground is produced. In the disconnected position, the moveable contact piece of the isolator is located in a mid-position between the connected position and the grounding position.

Conventional three-position isolators are known as sliding-contact switches or knife switches.

In general, isolators are used as an independent device in the same gas compartment as the load switch or circuit breaker or, in particular in the case of double-busbar arrangements, in the same gas compartment as the busbar or even in a separate gas compartment. The electrical part of these devices is always part of the gas compartment and is connected to the drive by means of a gas-tight bushing, which drive is usually located outside the gas compartment and is generally in the form of a mechanical or magnetic drive in medium-voltage applications.

In the known double-busbar arrangements, firstly a three-position isolator and secondly a two-position isolator (no grounding position) are located in the two separate busbar compartments.

Grounding of the outgoing section for the safety of operating personnel, for example during maintenance or installation work, takes place in any case via the grounding position of the three-position isolator and of the connected circuit breaker. Corresponding electrical and/or mechanical latching devices prevent both the grounding position of the three-position isolator from being left unintentionally and disconnection of the circuit breaker and therefore ensure safe grounding of the outgoing section.

The above-described method for grounding the outgoing section is accepted in many parts of the world and its use is widespread. As regards the American market, however, both an additional isolator and an additional ground conductor are required in the outgoing section, i.e. between the circuit breaker and the outgoing feeders, which are usually in the form of cables but are also in the form of a solid-insulated or gas-insulated rail.

The isolator in the outgoing section, in addition to the isolator in the busbar compartment, isolates the ground potential in the outgoing section and the high-voltage potential of the busbar from one another.

However, this requirement can often not be implemented owing to the predetermined dimensions and arrangements of the individual functional compartments.

The invention is therefore based on the object of fulfilling said requirements and adapting a gas-insulated medium-voltage switchgear assembly to the particular requirements of the market.

The set object is achieved in the case of a gas-insulated medium-voltage switchgear assembly of the generic type, according to the invention, by the characterizing features of patent claim 1.

Further advantageous refinements are specified in the dependent claims.

The essence of the invention consists in the fact that the circuit breaker compartment is dimensioned such that both the circuit breakers and the isolators and ground conductors on the outgoing section side are arranged therein.

That is to say, in order to be able to maintain a design which is as compact as possible and virtually unchanged external dimensions as regards the width, height and depth of the switchgear assembly, only the circuit breaker compartment is changed to the extent that it is enlarged in the direction of the cable connection, i.e. in terms of its height, and all three required devices can be arranged in it, i.e. the circuit breaker and the isolator on the outgoing section side and the ground conductor on the outgoing section side.

With regard to the position of the busbars, it is ensured that fields in this special embodiment can be coupled on the busbar side without any problems to the standard embodiment (without any isolators and ground conductors on the outgoing section side).

Particular mention should be made of the fact that, in this case, the virtually standard embodiment of the three-position or two-position isolators is not dependent on whether they are arranged in the busbar compartments or in the circuit breaker compartment.

In one advantageous refinement, it is specified that latching means are provided which make it possible for the ground conductor in the outgoing section only to be introduced when the isolator located beneath the circuit breaker is open. For safe and primarily redundant grounding of the outgoing section, both the circuit breaker and the grounding switch in the busbar compartment and the isolator and the ground conductor in the outgoing section need to be closed, i.e. connected.

A further design feature is the fact that the isolator can only be opened via the latching means when the circuit breaker has previously been disconnected. In this construction, the latching elements can also be accommodated and attended to easily.

A further advantageous refinement provides that the drives 13 for the switching devices are located exclusively in the low-voltage compartment (4) and can be actuated both by a motor and by a manual drive. Owing to the design according to the invention, this can also be achieved in a very compact manner.

A further advantageous design feature is the fact that current transformers and/or current sensors (9) are arranged in the circuit breaker compartment. In this way, all the necessary and possible functions can also be combined in terms of construction.

A further advantageous refinement specifies that female connectors 12 are provided, via which voltage transformers 11 can be connected externally.

A final but fundamental advantageous refinement specifies that both the isolator on the outgoing section side and the ground conductor on the outgoing section side are in the form of sliding-contact switches.

Designing the isolators and ground conductors in the form of sliding-contact switches firstly makes a compact, space-saving construction of the switchgear assembly possible and secondly makes increased functionality possible as regards the isolation capacity or the dielectric strength.

The actuation of the drives 13 by motor or manually, for example if no auxiliary voltage is available, represents operation-related actions. Motor-driven drives 13 can also be operated manually, for example in the unlikely event of failure of the auxiliary voltage, which represents a so-called "manual emergency-stop" actuation.

One exemplary embodiment of the invention is illustrated in the drawing and described in more detail below.

Figure 1:
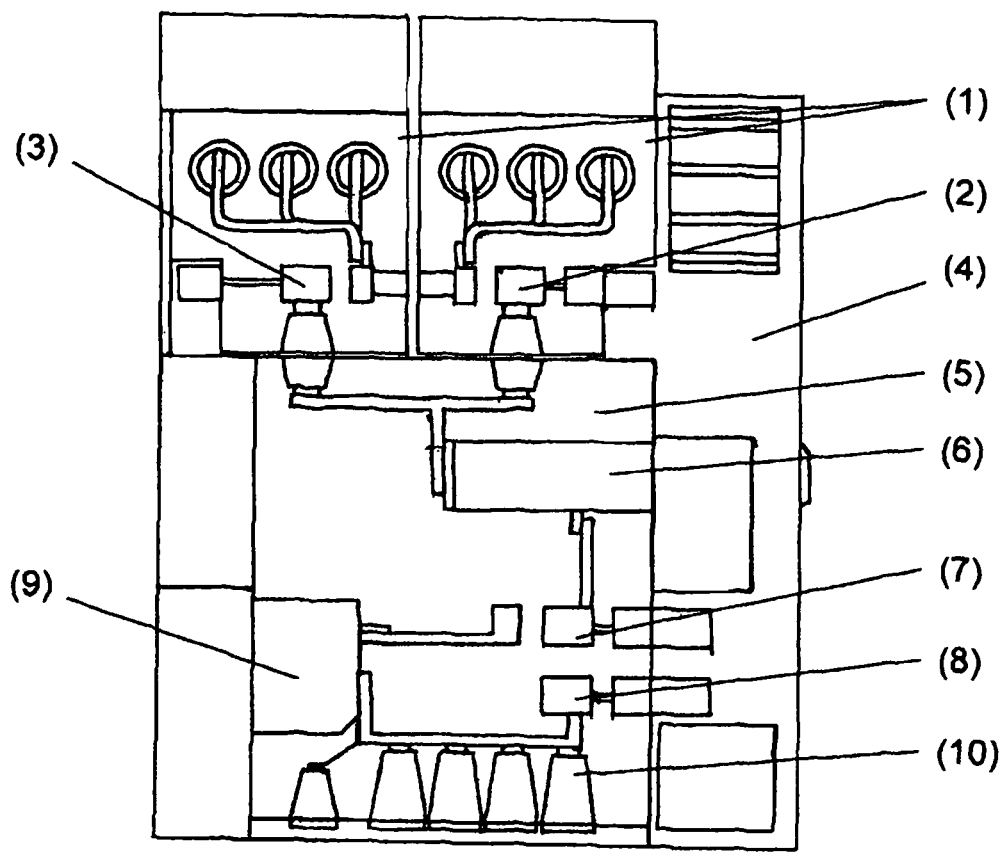
FIG. 1 shows the one exemplary embodiment of the gas-insulated medium-voltage switchgear for one phase.

FIG. 1 shows the two busbar compartments (1), which are equipped as standard with a three-position isolator (2) or two-position isolator (3), and the circuit breaker compartment (5), having a circuit breaker (6) and the two additional devices, the isolator (7) or ground conductor (8) on the outgoing section side. The latter, as isolators, implement the open or closed current path between the lower connection of the circuit breaker and the outgoing feeders (10), and, as ground conductors, implement grounding of the outgoing feeders in the connected state.

Figure 2:
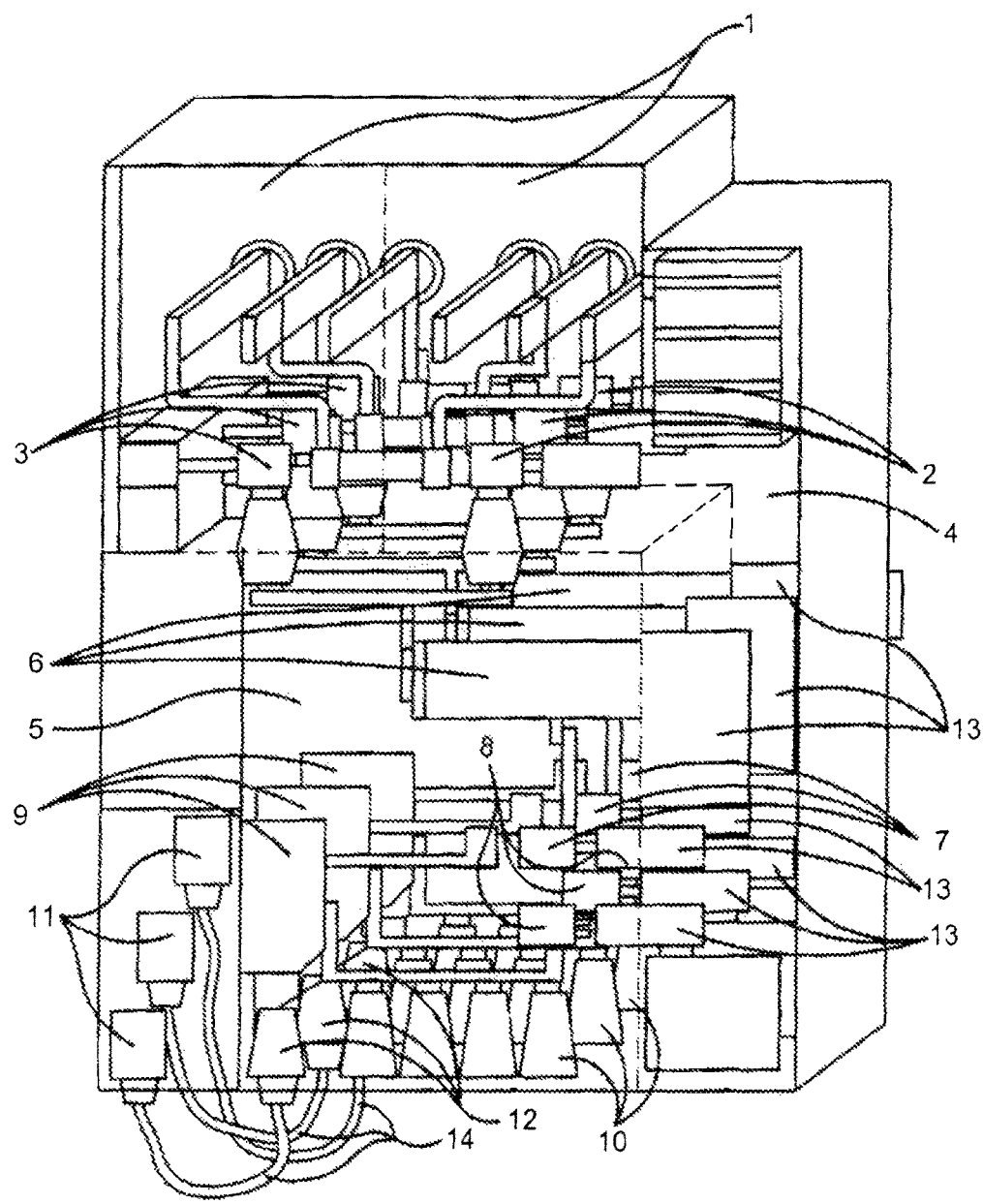
FIG. 2 shows the one exemplary embodiment of the gas-insulated medium-voltage switchgear for three phases.

FIG. 1 is for one phase and thus shows only one three-position isolator 2, one two-position isolator 3, one circuit breaker 6, one isolator 7 and one ground conductor 8, one drive 13 for each of circuit breaker 6, isolator 7 and ground conductor 8, one current transformer 9 and one voltage transformer 11 connected by flexible cable 14 to connector 12. As is well known, each phase has an associated isolator 2, 3, 7, circuit breaker 6, ground conductor 8, current transformer 9, voltage transformer 11, connector 12, drive 13 and flexible cable 14 and these components are shown in FIG. 2.

The latching concept envisages that the ground conductors in the outgoing section can only be introduced when the isolator located beneath the circuit breaker is open. For safe and primarily redundant grounding of the outgoing section, both the circuit breaker and the grounding switch in the busbar compartment and the isolator and the ground conductor in the outgoing section need to be closed, i.e. connected.

In turn, the isolator can only be opened when the circuit breaker has previously been disconnected.

The drives 13 of the switching devices are located exclusively in the low-voltage compartment (4) and can be actuated by a motor and in the form of a manual drive.

Furthermore, current transformers or current sensors (9) can be arranged in the circuit breaker compartment. Voltage transformers (11) can be adapted via a female connector 12 and are connected to an associated one of connectors 12 by an associated one of flexible cables 14.

1 Busbar compartment
2 Three-position isolator
3 Two-position isolator
4 Low-voltage compartment
5 Circuit breaker compartment
6 Circuit breaker
7 Isolator on the outgoing section side
8 Ground conductor
9 Current transformers or current sensors
10 outgoing feeders
11 Voltage transformers
12 Connector
13 Drives
14 Flexible cable

The invention claimed is:

1. A gas-insulated medium-voltage switchgear assembly comprising circuit breakers, isolators and ground conductors, wherein a circuit breaker compartment thereof is dimensioned such that both (i) said circuit breakers and (ii) said isolators and ground conductors in an outgoing section, are arranged therein.

2. The gas-insulated medium-voltage switchgear assembly of claim 1 wherein in said outgoing section side each of said circuit breakers has an associated one of said isolators and ground conductors.

3. The gas-insulated medium-voltage switchgear assembly of claim 1 further comprising a low-voltage compartment and drives located exclusively in said low-voltage compartment for said circuit breakers and said isolators in said circuit breaker compartment, said drives located exclusively in said low-voltage compartment can be actuated both by a motor and by a manual drive.

4. The gas-insulated medium-voltage switchgear assembly of claim 1 further comprising current transformers and/or current sensors arranged in said circuit breaker compartment.

5. The gas-insulated medium-voltage switchgear assembly of claim 1 further comprising female connectors by way of which voltage transformers can be connected externally to said switchgear.

6. The gas-insulated medium-voltage switchgear assembly of claim 1 wherein both said isolators and said ground conductors in said outgoing section side are in the form of sliding-contact switches.

7. A gas-insulated medium-voltage switchgear assembly having an output-side, said switchgear assembly comprising circuit breakers, disconnectors, and earth electrodes, wherein a circuit breaker compartment thereof is dimensioned so that said circuit breakers, said disconnectors and said earth electrodes are all arranged in said circuit breaker compartment, which is arranged directly on said output-side of the switchgear.

8. The gas-insulated medium-voltage switchgear assembly of claim 1 wherein said isolators and said ground conductors are separate from each other.

9. The gas-insulated medium-voltage switchgear assembly of claim 7 wherein said disconnectors and said earth electrodes are separate from each other.

10. A gas-insulated medium-voltage switchgear assembly comprising circuit breakers, isolators and ground conductors, wherein a circuit breaker compartment thereof is dimensioned such that both (i) said circuit breakers and (ii) said isolators and ground conductors in an outgoing section, are arranged therein and said isolators and said ground conductors are separate from each other.

* * * * *